(12) United States Patent  
Huang

(10) Patent No.: US 6,460,663 B1  
(45) Date of Patent: Oct. 8, 2002

(54) HYDRAULIC VIBRATION DAMPER FOR MOTOR VEHICLES

(75) Inventor: Zhen Huang, Würzberg (DE)

(73) Assignee: Krupp Bilstein GmbH, Ennepetal (DE)

( * ) Notice: Subject to any disclaimer, the term of this patent is extended or adjusted under 35 U.S.C. 154(b) by 0 days.

(21) Appl. No.: 09/762,862

(22) PCT Filed: Jul. 15, 1999

(86) PCT No.: PCT/EP99/05007

§ 371 (c)(1),  
(2), (4) Date: Feb. 7, 2001

(87) PCT Pub. No.: WO00/09912

PCT Pub. Date: Feb. 24, 2000

(30) Foreign Application Priority Data

Aug. 11, 1998 (DE) .......................... 198 36 286

(51) Int. Cl.[7] .............................. F16F 9/348; F16F 9/34
(52) U.S. Cl. ................................. 188/282.4; 188/266.5
(58) Field of Search ............................ 188/280, 282.1, 188/282.2, 282.3, 282.4, 266.2, 266.5, 267

(56) References Cited

U.S. PATENT DOCUMENTS

| | | | | |
|---|---|---|---|---|
| 2,592,656 A | * | 4/1952 | Catranis ...................... | 188/285 |
| 4,723,640 A | * | 2/1988 | Beck .......................... | 188/282.3 |
| 4,974,707 A | * | 12/1990 | Neumann et al. ......... | 188/282.4 |
| 5,035,306 A | * | 7/1991 | Ashiba ........................ | 188/282.3 |
| 5,064,032 A | * | 11/1991 | Ashiba ........................ | 188/282.4 |
| 5,927,449 A | * | 7/1999 | Huang et al. ............. | 188/282.2 |
| 5,950,775 A | * | 9/1999 | Achmad ..................... | 188/282.2 |

FOREIGN PATENT DOCUMENTS

| | | | | |
|---|---|---|---|---|
| DE | 40 20 045 C1 | * | 8/1991 | |
| EP | 0 829 383 A | * | 3/1998 | |
| JP | 3-217311 A | * | 9/1991 | .............. 188/282.4 |

* cited by examiner

Primary Examiner—Jack Lavinder  
Assistant Examiner—Thomas J. Williams  
(74) Attorney, Agent, or Firm—Max Fogiel

(57) ABSTRACT

A hydraulic vibration damper for motor vehicles comprising a cylinder (1) containing damping fluid and a sealed, axially displaceable piston rod (2) that plunges into said cylinder. A damping piston (3) is secured to the lower end of the piston rod and divides the cylinder area into two working areas (4, 5). Said damping piston is provided with passages that can be modified and which are controlled by throttle valve bodies, in addition to a bypass for the pressure and traction stage, whereby the cross-section of the bypass is adjusted by an electrovalve that functions in three or more stages and the toroid coil more or less opens a valve slide (13), whereupon two or more bypass openings are released in a successive manner. The inventive damper is designed in such a way disruptive influences caused by constantly changing hydraulic forces arising from the flow of the damping agent are reduced when the flow from the bypass channels is shifted or controlled. At least the first bypass channel (27) that is released when the valve slide (13) is in a closed position has a contraction (33) that is 8J, located at a distance from the valve slide (13).

4 Claims, 1 Drawing Sheet

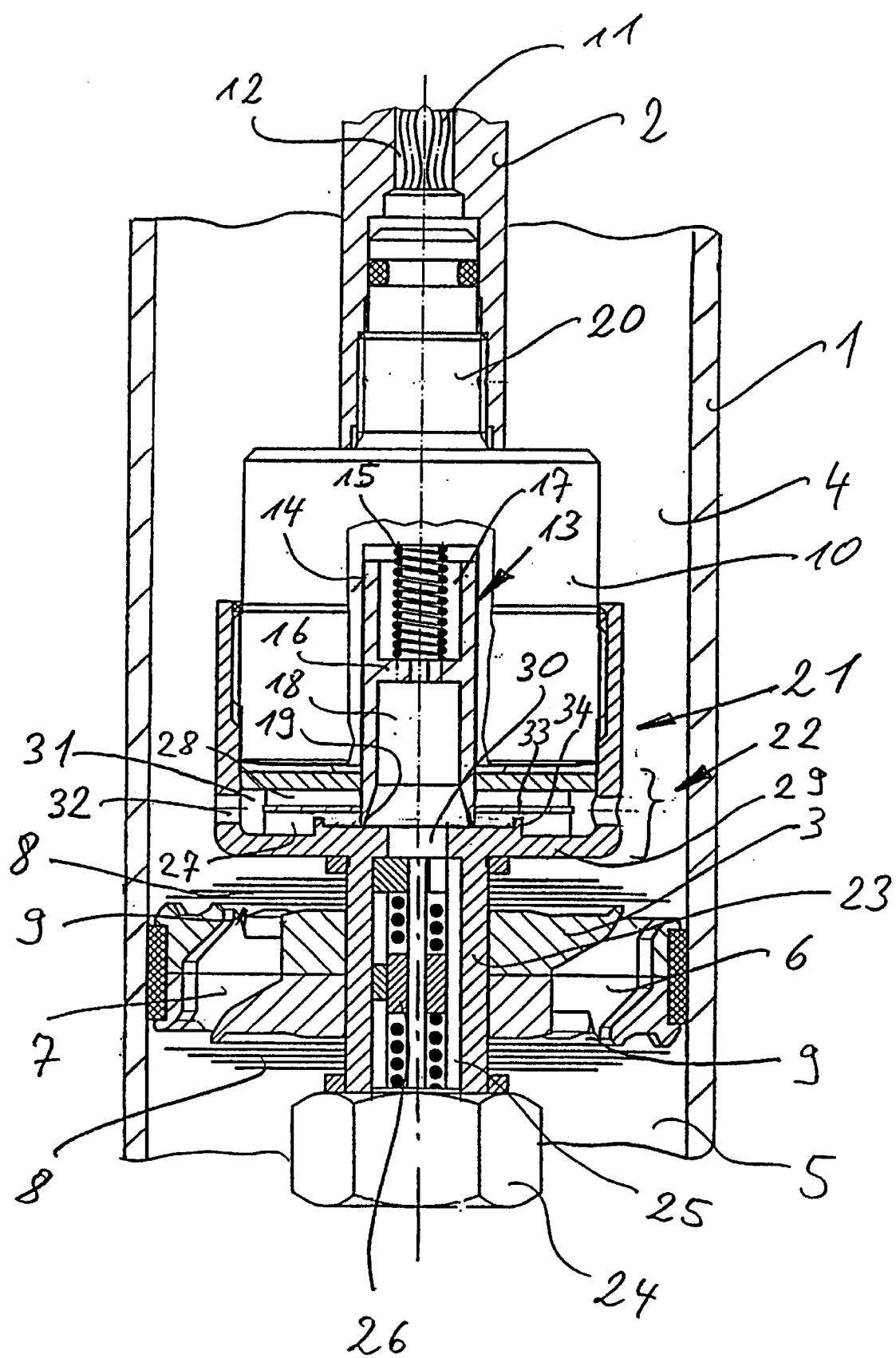

HYDRAULIC VIBRATION DAMPER FOR MOTOR VEHICLES

BACKGROUND OF THE INVENTION

The present invention concerns a hydraulic dashpot for motor vehicles, with a shock-absorbing piston that accommodates bypasses that can be alternatingly opened and closed.

Adapting the performance of a motor-vehicle hydraulic dashpot to external driving conditions by re-adjusting it while the vehicle is in operation is known. This function is ensured in one such known dashpot by providing the piston with both hydraulically controlled constrictions and alternatingly open and closed bypasses.

Both DE 3 518 327 C2 and DE 4 020 045 C1 disclose such a hydraulic dashpot. These devices, however, have a drawback in that the hydraulic fluid can flow very rapidly, especially along the controlling edges of the valve's plunger, when a narrow bypass opens and there is a wide difference in pressure between the hydraulics chambers. The result is excessively high hydraulic forces that in the extreme case can impair the accuracy of the plunger's alternating action. It has often been attempted to combat this problem by controlling several bypasses with a single solenoid valve or by a bypass maintained constantly open by a solenoid. Alternative solutions involve either revolving regulators or several solenoid valves, although they usually occupy too much space.

SUMMARY OF THE INVENTION

The object of the present invention is an advanced hydraulic dashpot wherein the disruptive effects that occur due to the constantly varying forces exerted by the fluid when its flow through the bypasses is controlled or diverted will be decreased.

The present invention has several advantages. First, the means of selecting and of varying the width of the bypasses are very simple and compact. Furthermore, the means are very insensitive to hydraulic influence.

BRIEF DESCRIPTION OF THE DRAWINGS

The present invention will now be specified with reference to the accompanying drawing, a single FIGURE in the form of a section through a hydraulic dashpot.

DESCRIPTION OF THE PREFERRED EMBODIMENTS

A piston rod 2 travels in and out of a cylinder 1. Cylinder 1 contains an impact-accommodating fluid. A piston 3 is mounted on the forward end of piston rod 2, dividing the interior of the cylinder into two dynamic compartments 4 and 5. Piston 3 is penetrated by passages 6 and 7 that allow the fluid to flow through it during both the compression and the decompression phases. A stack of cup springs 8 functions as both a one-way valve and a throttle valve, releasing or blocking a series of ports 9 in accordance with the difference in pressure between compartments 4 and 5. The attenuation achieved by the dashpot is accordingly maintained constant by piston 3 in conjunction with its associated valves.

For some applications, varying this constant attenuation in accordance with varying conditions is known, and this is accomplished in the present embodiment by a system of bypasses that separate the performance established by piston 3 into two stages. The adjustment mechanism is a three-or-more stage solenoid with a coil accommodated in a housing 10 provided with electric current by way of lines. Lines 11 extend through a bore 12 through the center of piston 3. The bypasses are released and blocked by a cylindrical plunger 13 that travels axially in and out of a bore 14 through the center of coil housing 10 and acts as a valve.

Plunger 13 can be shifted into one of two different positions against the force of a compressed helical spring 15 in accordance with the level of electricity flowing through the coil.

Plunger 13 is a hollow cylinder with a partition 16 in the middle that divides into two opposing flower-pot shaped halves 17 and 18, upper half 17 accommodating spring 15 and lower half 18 provided with an insulating disk 19 at its bypasses-opening edge.

Piston rod 2 has an inside thread at one end, and coil housing 10 is fastened to it at that end by an outside-threaded bolt 20. An adapter 21 is secured to coil housing 10 by way of a threaded section and extends below coil housing 10, attaching piston 3. The center of adapter 21 constitutes a valve assembly 22 provided with a downward extension 23 in the form of a hollow cylinder. Piston 3 is mounted around extension 23 and secured to it by a nut 24. Extension 23 accommodates a bypass intake and outlet 25. Intake and outlet 25 itself accommodates single-direction valves 28 that allow adjustment of the bypass performance to the dashpot's individual compression and decompression stages.

Two systems of bypasses 27 and 28 are superimposed one over the other at the center of adapter 21 and extend radially outward like the spokes of a wheel. They derive from a bore at the center that can be entered and accordingly closed off by plunger 13. The floor 29 of each lowermost bypass 27 extends farther inward radially and functions as a seat for the insulating disk 19 associated with plunger 13. Floor 29 is provided with a central bore 30 that allows hydraulic communication with intake and outlet 25.

The systems of bypasses 27 and 28 terminate at the circumference in an annular channel 31 that itself communicates with compartment 4 by way of radial bores 32 through the wall of adapter 21.

Electrically actuated two-stage adjustment of plunger 13 allows the superimposed systems of bypasses 27 and 28 to be opened and closed one after another. To ensure safe operation, spring 15 closes off both systems in the event of a power failure, hardening the bypass's performance.

System of bypasses 27, which is the first system to be opened, is to some extent remote from plunger 13 and is provided with a constriction 33. The constriction 33 in the illustrated embodiment is in the form of an interior bead 34, although it could just as well be a separately inserted metal or plastic ring or similar structure. It could also be elastic or resilient, varying the width of the bypass in accordance with the prevailing difference in pressure between compartments 4 and 5.

The specific distance between constriction 33 and plunger 13 ensures that the hydraulic effects deriving from the rapid flow of fluid will hardly influence the plunger's action. Plunger 13 can accordingly easily and reliably be retained in its initial bypasses-open position by the previously established level of magnetism. The plunger's bypasses all-the-way closed and the-way open positions illustrated in the accompanying drawing will accordingly be relatively unaffected by the hydraulically induced forces.

List of Parts 1. cylinder
2. piston rod
3. piston
4. compartment
5. compartment
6. passage
7. passage
8. cup spring
9. port
10. coil housing
11. line
12. bore
13. plunger
14. bore
15. spring
16. partition
17. half
18. half
19. insulating disk
20. bolt
21. adapter
22. valve assembly
23. extension
24. nut
25. intake and outlet
26. one-direction valve
27. lowermost bypass
28. uppermost bypass
29. floor
30. bore
31. annular channel
32. radial bores
33. constriction
34. bead

What is claimed is:

1. A hydraulic dashpot for motor vehicles comprising:

a cylinder containing shock-absorbing fluid; a piston rod traveling axially in and out of said cylinder through a sealed opening; a shock-absorbing piston at an inner end of said piston rod; said piston separating said cylinder into two compartments and having passages controlled by throttle-valve assemblies; a bypass associated with compression and decompression stages; said bypass having a width varied by at least a three-stage solenoid comprising a coil accommodating a valve in form of a plunger traveling in and out dependent on an electromagnetic force exerted by said coil and opens at least two bypasses one after another in succession; at least a first one of said bypasses opened by said plunger when leaving a bypasses-closed position accommodates a constriction at a distance from said plunger, said at least three-stage solenoid being a solenoid with at least three operating positions, said at least two bypasses remaining separated independent of said plunger so that only after one of said two bypasses is fully opened is the other one of said bypasses opened for reducing effects of constantly varying fluid forces when flow through said bypasses is controlled; said plunger being a cylinder and said bypasses extending radially out from a common axis; the plurality of bypasses being stacked on top of one another, said plunger blocking and releasing said bypasses' innermost openings one after another.

2. A dashpot as defined in claim 1, wherein said plunger has a tapered shape.

3. A dashpot as defined in claim 1, wherein said constriction has a variable size.

4. A hydraulic dashpot for motor vehicles comprising: a cylinder containing shock-absorbing fluid; a piston rod traveling axially in and out of said cylinder through a sealed opening; a shock-absorbing piston at an inner end of said piston rod; said piston separating said cylinder into two compartments and having passages controlled by throttle-valve assemblies; a bypass associated with compression and decompression stages; said bypass having a width varied by at least a three-stage solenoid comprising a coil accommodating a valve in form of a plunger traveling in and out dependent on an electromagnetic force exerted by said coil and opens at least two bypasses one after another in succession; at least a first one of said bypasses opened by said plunger when leaving a bypasses-closed position accommodates a constriction at a distance from said plunger, said at least three-stage solenoid being a solenoid with three operating positions, said at least two bypasses remaining separated independent of said plunger so that only after one of said two bypasses is fully opened is the other one of said bypasses opened for reducing effects of constantly varying fluid forces when flow through said bypasses is controlled; said plunger being a cylinder and said bypasses extending radially from a common axis; the plurality of bypasses being stacked on top of one another, said plunger blocking and releasing said bypasses' innermost openings one after another; said plunger having a tapered shape; said constriction having a variable size.

* * * * *